Dec. 13, 1927.

E. H. FUNDOM 1,652,240

COMBINED CLUTCH AND DRUM AND MOUNTING THEREFOR

Filed Feb. 14, 1927

Inventor
E. H. Fundom
By
Eccleston & Eccleston,
Attorneys

Patented Dec. 13, 1927.

1,652,240

UNITED STATES PATENT OFFICE.

EARL H. FUNDOM, OF LIMA, OHIO, ASSIGNOR TO THE FUNDOM HOIST AND SHOVEL COMPANY, OF LIMA, OHIO, A CORPORATION OF OHIO.

COMBINED CLUTCH AND DRUM AND MOUNTING THEREFOR.

Application filed February 14, 1927. Serial No. 168,212.

This invention relates to clutches for the transmission of power and more particularly to clutches of the friction type in which conical or frusto-conical surfaces are caused to engage and frictionally grip each other.

An object of the invention resides in the simplification of the construction of such clutches while at the same time rendering the same more durable and more positive in operation.

A further object of the invention consists in a novel combination of clutch and winding drum, and in a novel means, for mounting the same on the end of a driving axle of an automobile such as a Fordson.

Figure 1:
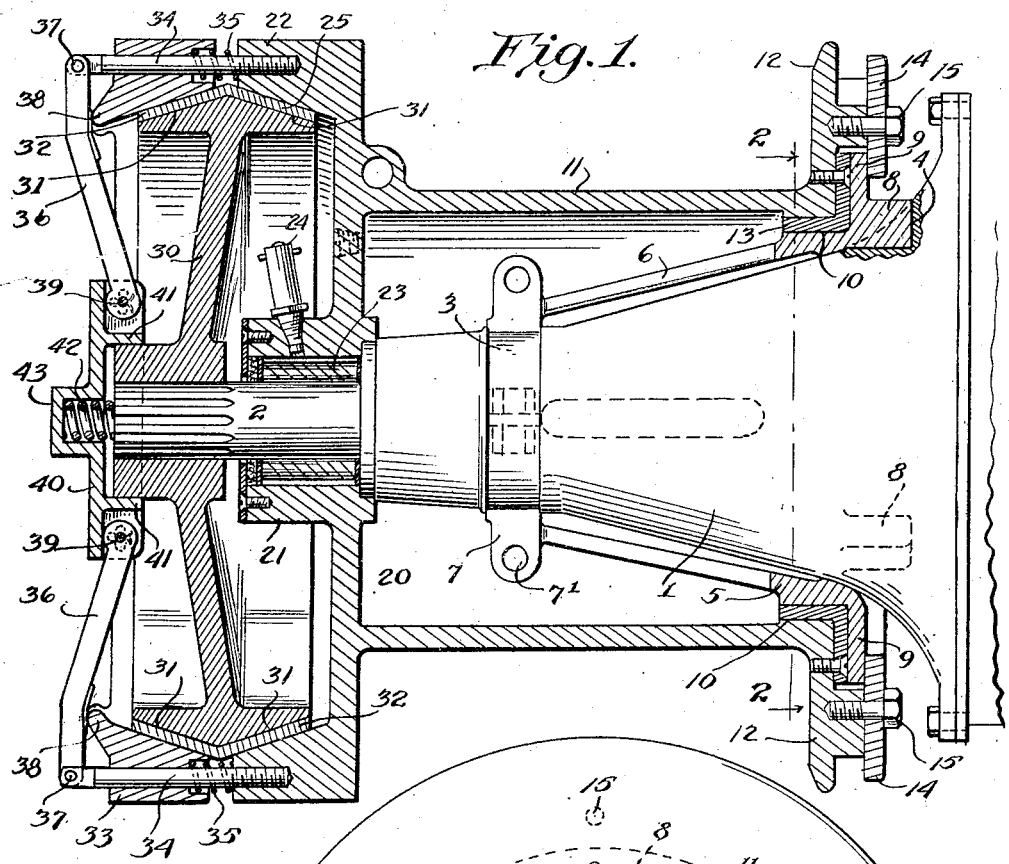
Figure 2:
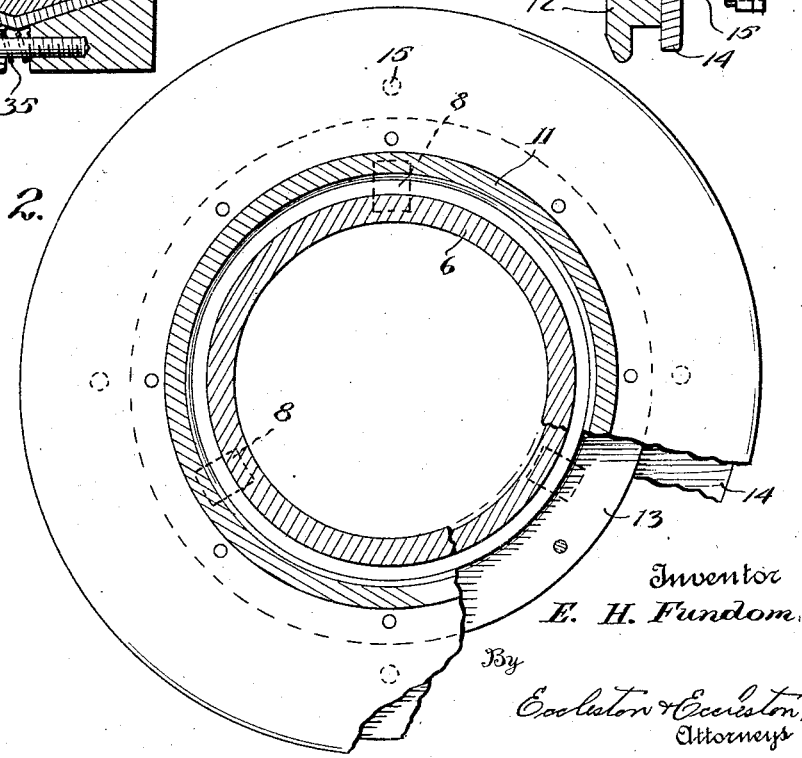

Other objects and advantages of the invention will be apparent from the following description when taken in connection with the accompanying drawings; in which, Figure 1 is a longitudinal section through the device, the axle and housing being shown as partly broken away; and Figure 2 is a sectional view taken on the line 2—2 of Figure 1, parts being broken away to more clearly disclose certain details of construction.

More specifically, the numeral 1 designates the end housing for the driving axle 2 of an automobile; the housing shown being of the type employed on Fordson tractors now in common use. To adapt this housing to the present invention the same is provided with an annular groove 3 and a plurality of depressions 4, adapted to receive the fittings for a bearing member on which is rotatably mounted a drum to be described hereinafter.

The bearing member is indicated by the numeral 5 and comprises a substantially frusto-conical element 6 which is slotted at its smaller end to provide arcuate sections 7 adapted to be tightly bolted together through bolt holes 7'. The larger end of the bearing member 6 is formed in one continuous piece and is provided with longitudinally extending lugs 8 adapted to be seated in depressions 4 in the housing 1. Three of these lugs and depressions are shown in the drawing as illustrative of the manner of mounting the bearing member but it will be understood that this number may be varied to suit requirements. In applying the member 6 to the housing 1 the former is slipped over the end of the housing and forced inwardly until the lugs 8 seat in the depressions 4, the arcuate sections 7 springing into the annular groove 4 and being then bolted together. In this manner the bearing member is rigidly though detachably clamped to the housing.

The bearing member 6 is provided with an annular, outwardly-directed flange 9 and an adjacent seat 10 adapted to serve as a bearing for the inner end of a drum 11. This drum is provided with an outwardly-directed flange 12 to which is attached the angular strip of Babbitt metal or similar bearing material 13, which is disposed against the flange 9 and seat 10. These elements are held in operative relationship by means of a metallic ring 14 which overlaps the exterior surface of the flange 9 and is rigidly connected to the flange 12 of the drum 11 by means of bolts 15. It will thus be apparent that the drum 11 is rotatably mounted upon the bearing member 6.

Integrally formed on the outer end of the drum 11 is a disc 20 provided with a hub 21 at its center and a flange or clutch element 22 at its periphery. The hub 21 is provided with roller bearings 23 which are disposed between the axle 2 and the hub, and the latter is also provided with a grease cup 24 to provide proper lubrication. The inner surface of the flange 22 is tapered as indicated by numeral 25 for the purpose of forming a tight fit against a similarly tapered wall of a clutch wheel to be described.

Splined to the axle 2 is a clutch wheel 30 formed with a rim or band having the two inclined surfaces 31 which are covered by a friction band of leather or the like 32. Mounted for cooperation with another of the inclined surfaces 31 of the clutch wheel 30 is a ring 33 having its inner face inclined for engagement with the friction band 32. This ring is connected with the clutch member 22 by means of bolts 34 on which it is slidably mounted, and springs 35 are disposed on the bolts so as to normally bias the ring 33 away from the element 22. For the purpose of imparting an axial movement to the ring 33 so as to wedge the same onto the wheel 30 levers 36 are pivoted at 37 to the outer ends of the bolts 34 and have bearing on the annular projection 38 extending laterally from the ring. The inner ends of the levers 36 are pivotally connected at 39 to a disc 40 which has a guide flange 41 in sliding engagement with the hub of the wheel 30. A spring 42 seated in a pocket 43 on the disc 40 has its inner end in engagement with the end of the axle 2. This spring 42 normally tends to throw the levers out of engagement with the projection 38 while a cam or any other type of power-applying means may be employed for forcing the disc 40 inwardly against the pressure of the spring.

In the operation of the device the drum is rotatably mounted on the bearings 6 and 23 as hereinbefore described, and when it is desired to place the drum in action the same is accomplished through the medium of any type of control mechanism. When the disc 40 is forced inwardly against the pressure of spring 42, the levers 36 are caused to apply pressure to the projection 38 thus forcing the tapered inner surface of the ring 33 against the friction band 32 on the outwardly inclined band of the wheel 30. This action of course compresses the springs 35 and also jams the friction band 32 on the other inclined face of the wheel 30 against the inclined face 25 of the clutch element 22 due to the sliding engagement of the wheel 30 with the axle 2. It is thus apparent that the drum 11 is clamped tightly to the wheel 30 through the wedging action of the clutch members 22 and 23 with the band 31 of the wheel, and that rotation of the axle 2 is transmitted to the drum.

From the foregoing description and the accompanying drawing it will be observed that I have devised a very simple and inexpensive drum and clutch mechanism which is durable and reliable in operation, and also a novel and substantial mounting for the clutch and drum whereby the same may be readily and quickly applied to the rear axle housing of Fordsons and the like.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. The combination with the driving axle and housing of an automobile of a bearing fixedly mounted on said housing, a cylindrical drum open at one end and provided with a hub at the other end, said drum being positioned on said housing with the edge of its open end mounted on said bearing and the hub mounted on said axle.

2. The combination with the driving axle and housing of an automobile of a bearing fixedly mounted on said housing, a cylindrical drum open at one end and provided with a hub at the other end, said drum being positioned on said housing with its open end mounted on said bearing and the hub mounted on said axle, and means for holding the open end of said drum in engagement with the bearing.

3. The combination with the driving axle and housing of an automobile of a bearing support, said support comprising a substantially frusto-conical member, spaced lugs on one end of said member and a ring or band on the other end of said member, said housing provided with depressions and an annular groove in which said lugs and ring respectively are seated.

4. A bearing support comprising a substantially frusto-conical member, spaced lugs on the larger end of said member, a ring on the smaller end of said member, said ring and the adjacent portion of said frusto-conical member being slotted to allow the ring to expand.

EARL H. FUNDOM.